United States Patent [19]
de Luna

[11] Patent Number: 5,613,696
[45] Date of Patent: Mar. 25, 1997

[54] SHOPPING TROLLEY FOR SUPERMARKETS AND THE LIKE

[75] Inventor: Gerardo S. de Luna, Barcelona, Spain

[73] Assignee: Policad Industrial, S.L., Pamplona, Spain

[21] Appl. No.: 358,372

[22] Filed: Dec. 19, 1994

[30] Foreign Application Priority Data

Mar. 4, 1995 [ES] Spain ................... 9400444

[51] Int. Cl.⁶ ......................... B62B 3/14
[52] U.S. Cl. ............... 280/33.992; 280/33.991; 280/DIG. 4
[58] Field of Search ............ 280/33.991, 33.992, 280/33.993, 33.995, 33.996, 33.997, 47.35, 47.34, 47.38, DIG. 4; 224/411

[56] References Cited

U.S. PATENT DOCUMENTS

| | | | |
|---|---|---|---|
| 2,890,057 | 6/1959 | Davis | 280/33.993 |
| 3,813,111 | 5/1974 | Ruger | 280/33.991 |
| 3,844,577 | 10/1974 | Wahl . | |
| 4,046,394 | 9/1977 | Thompson, Jr. | 280/33.993 |
| 4,544,171 | 10/1985 | Kellogg | 280/33.992 |
| 4,746,134 | 5/1988 | Rehrig | 280/33.991 |
| 5,210,968 | 5/1993 | Rehrig | 280/33.991 |
| 5,255,930 | 10/1993 | Jones et al. | 280/33.992 |
| 5,505,472 | 4/1996 | Trubiano | 280/33.993 |

FOREIGN PATENT DOCUMENTS

| | | | |
|---|---|---|---|
| 0222480 | 5/1987 | European Pat. Off. . | |
| 2537214 | 3/1977 | Germany . | |
| 8530050.0 | 1/1986 | Germany . | |
| 2181097 | 4/1987 | United Kingdom | 280/33.997 |
| 93/02903 | 2/1993 | WIPO | 280/33.991 |

Primary Examiner—Brian L. Johnson
Assistant Examiner—Min Yu
Attorney, Agent, or Firm—Nath & Associates; Gary M. Nath

[57] ABSTRACT

A shopping trolley having a basket (1) mounted on a support structure (4) and a user handle (5). The support structure is mounted on a wheeled carriage (2). The basket is openable at its rear to permit nesting of similar trolleys, and the rear opening is closed by a swinging flap (18) which is made up of a single plastics molding incorporating the basket (1) the support structure (4) and the wheeled carriage (2). Preferably the shopping trolley may have one or more generally flat areas (6) on the front and/or side walls of the basket (1). The areas (6) are surrounded by retaining ribs (7), and (6) are adapted for the insertion of advertising plates (20).

4 Claims, 8 Drawing Sheets

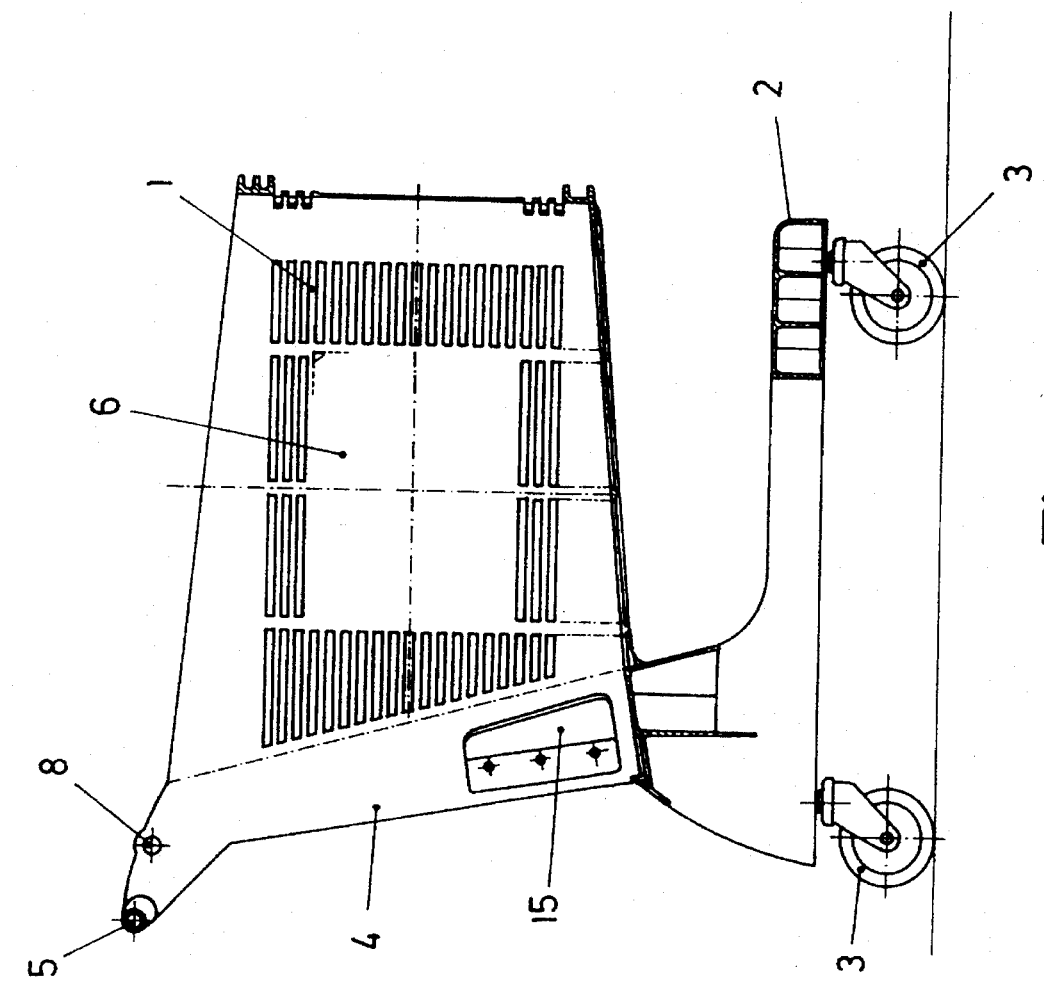
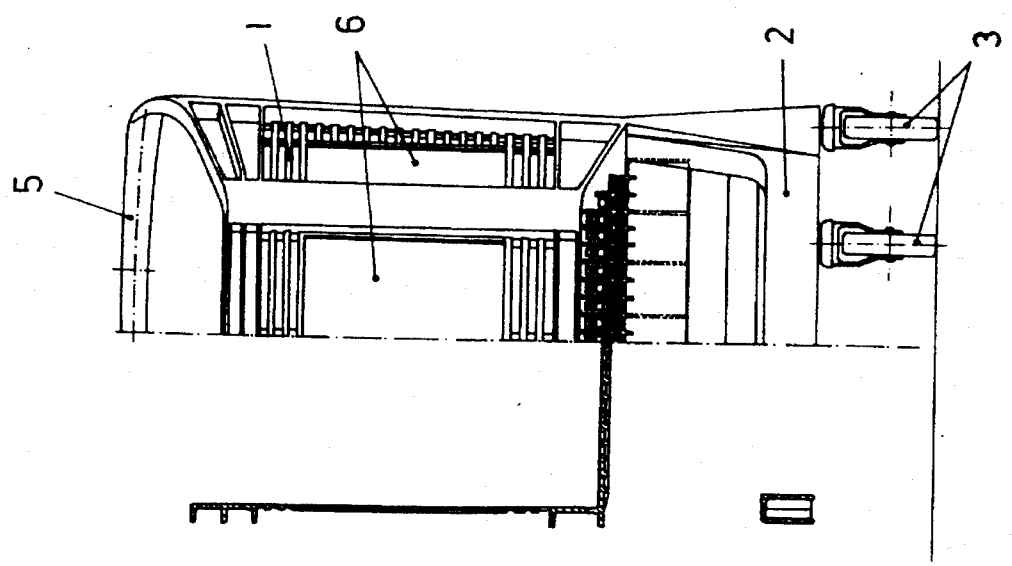
Fig. 4
Fig. 3

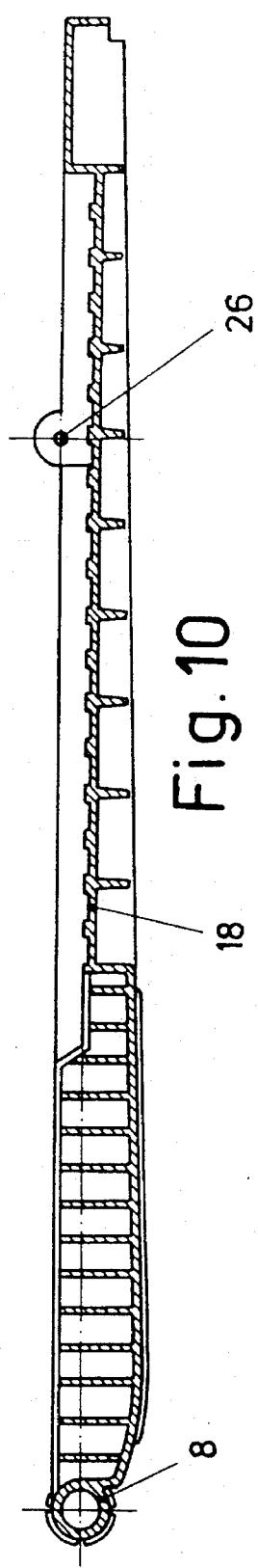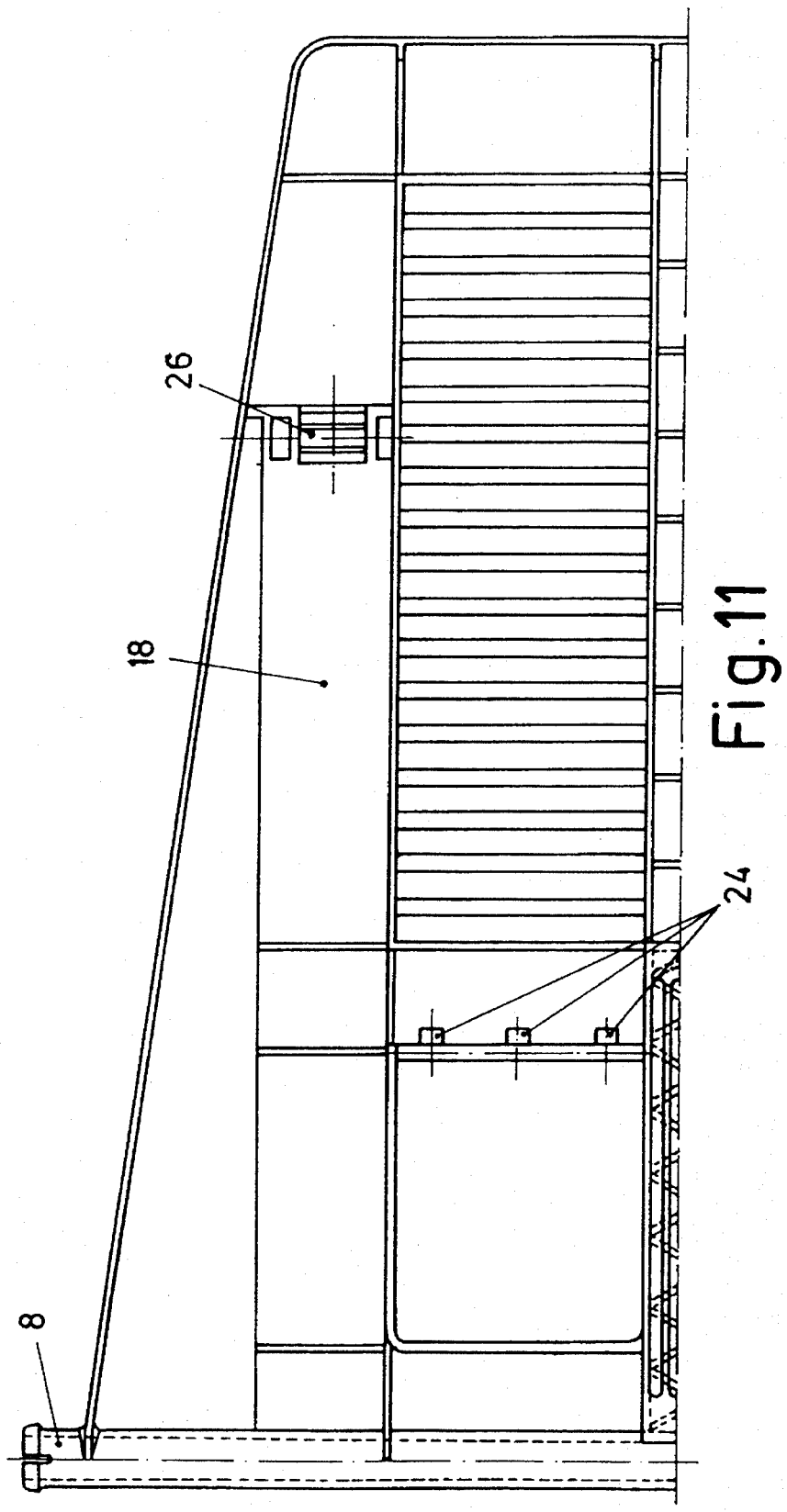

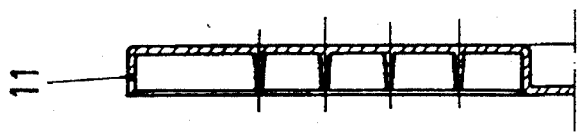
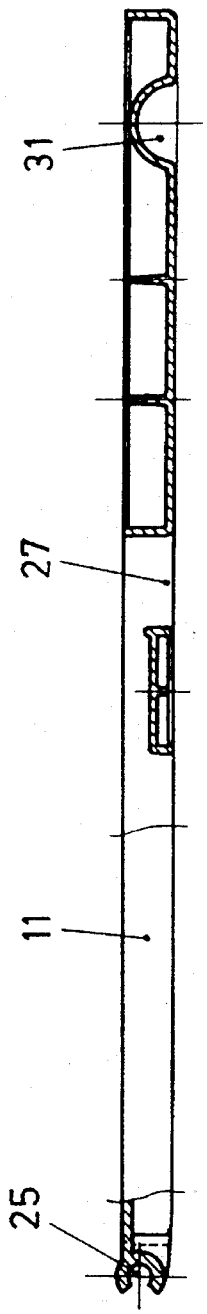
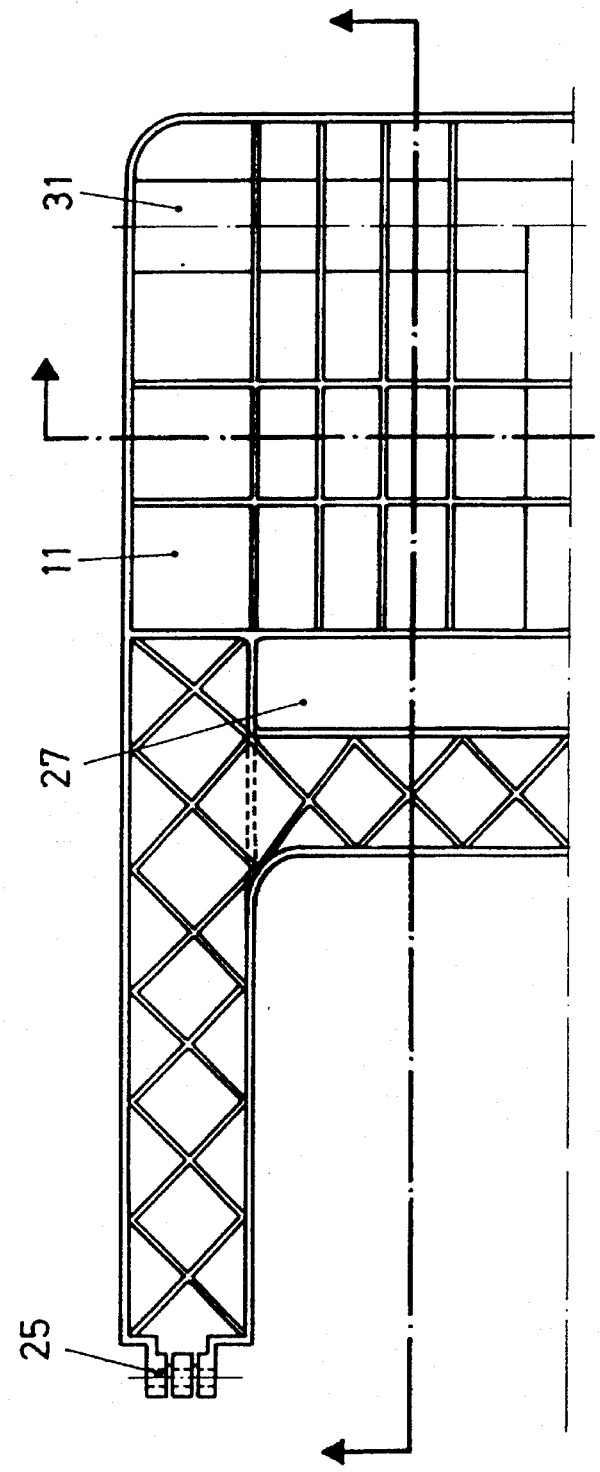

5,613,696

SHOPPING TROLLEY FOR SUPERMARKETS AND THE LIKE

BACKGROUND OF THE INVENTION

The present invention relates to a shopping trolley for supermarkets and the like.

In large establishments, such as supermarkets and the like, it is usual to provide shopping trolleys for the use of customers for the collection and movement of purchased goods, the said trolleys generally being fabricated from metal bars and rods.

A recent idea has been to take advantage also of the said trolleys as means of advertising, for which different solutions have been developed, which is all cases are based on the incorporation on the aforementioned trolleys of supports intended to carry the advertising slogans.

This however, with a conventional trolley leads to excessive costs, both in terms of their initial construction and also the application of means for carrying advertising slogans which suggests that a more advantageous construction might be in plastics, given the considerable constructional advantages which exist today with this type of material.

SUMMARY OF THE INVENTION

In accordance with this and conforming to the present invention there is proposed a trolley made up from an integral assembly in plastics, in which are jointly integrated the basket for holding the products and the supporting structure, with the need to incorporate only the corresponding rolling elements on the base, and the door defining the rear wall of the basket, which must be pivotable to allow the stacking of trolleys together, the mounting of the said door being achieved by means of a simple engagement of couplings between respective formations on the door and other corresponding formations on the structural body of the trolley.

On the side and front faces of the basket there is foreseen moreover the definition of areas for the incorporation of advertising plates, the areas being defined and shaped during the actual construction of the structural body of the trolley, without its being necessary to incorporate any accessory afterwards, other than simply attaching the desired advertising plates, by means of simple insertion.

By this is obtained a trolley with a simple and economical construction, whose realization permits an advantageous aesthetic aspect with the desired peculiarities, integrating in its actual formation the means for the easy incorporation of advertising plates without the need for any other element.

For which reasons the said trolley which is the object of the invention has advantageous characteristics, which give it a life of its own and a preferred character in relation to the conventional trolleys of the same type which currently exist, made from metal.

BRIEF DESCRIPTION OF THE DRAWINGS

In order better to understand the nature of the invention, in the attached drawings show, by way of purely illustrative and non limitative example, one preferred form of industrial realization, particularly described below.

In the said drawings:

FIG. 3 is a front elevation of the trolley, with one of the halves in cross section along a transverse plane at the level of half of the longitudinal dimension;

FIG. 4 is a side view in cross section of the trolley, without the rear flap of the basket;

FIGS. 10 and 11 correspond to a side view in cross section and corresponding half front view of the piece making up the rear flap of the basket;

FIGS. 12, 13 and 14 correspond to a side view in cross section, half front view and a respective transverse section of the plate forming the back of the folding seat incorporated in the aforementioned rear flap of the basket;

CLARIFYING DETAILS

Figure 1:
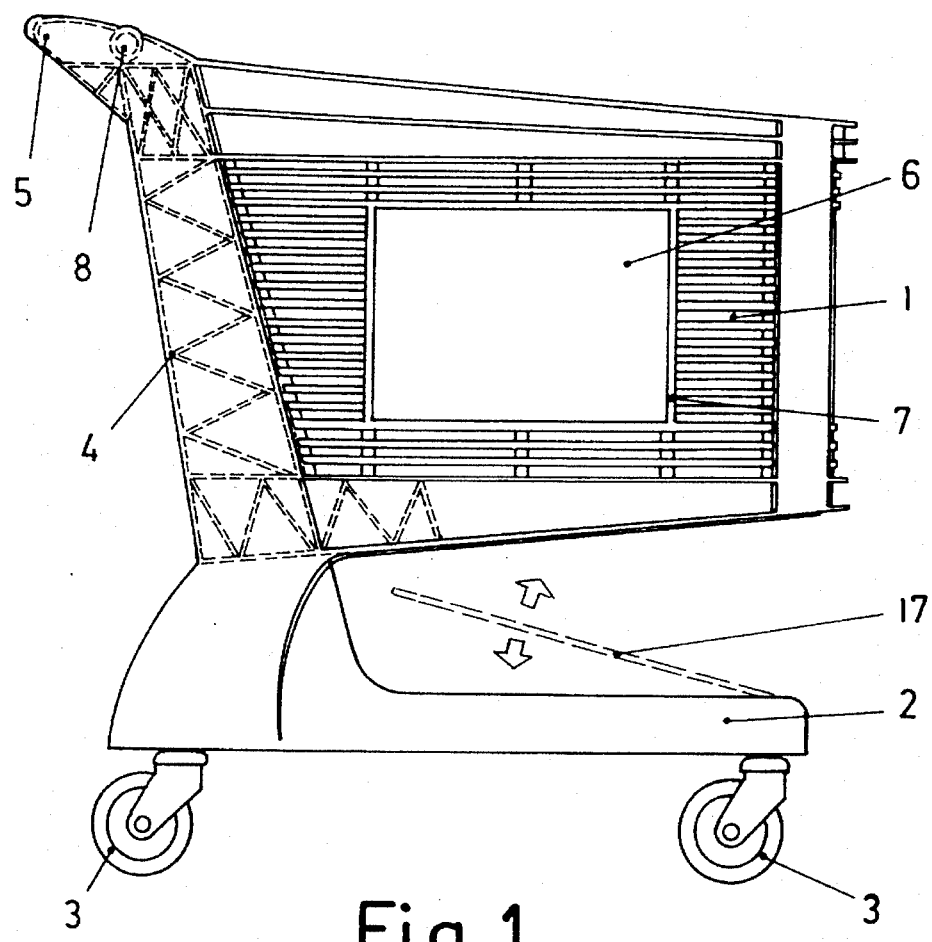
FIG. 1 shows a side elevation of a supermarket trolley.
Figure 2:
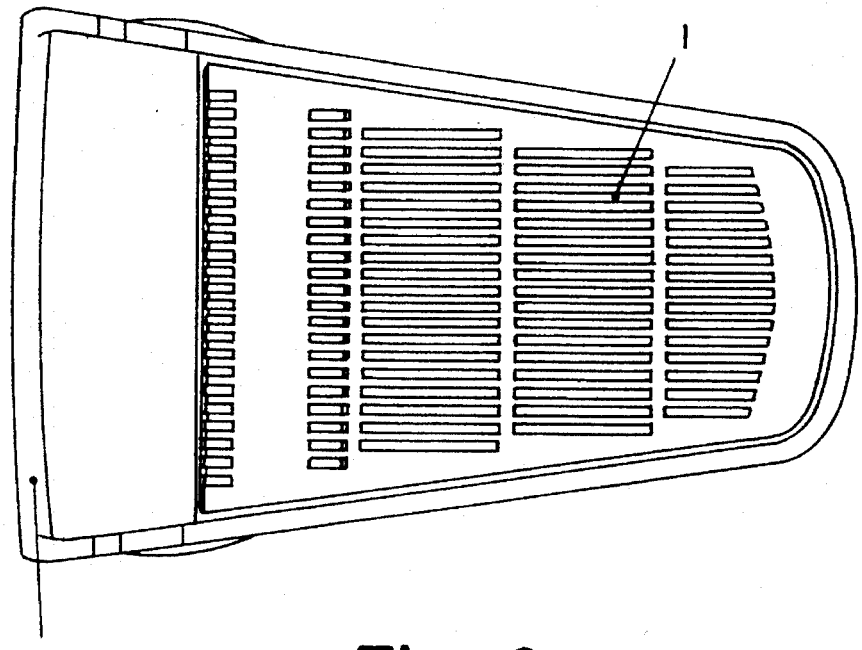
FIG. 2 is a corresponding plan view of the trolley.
Figure 5:
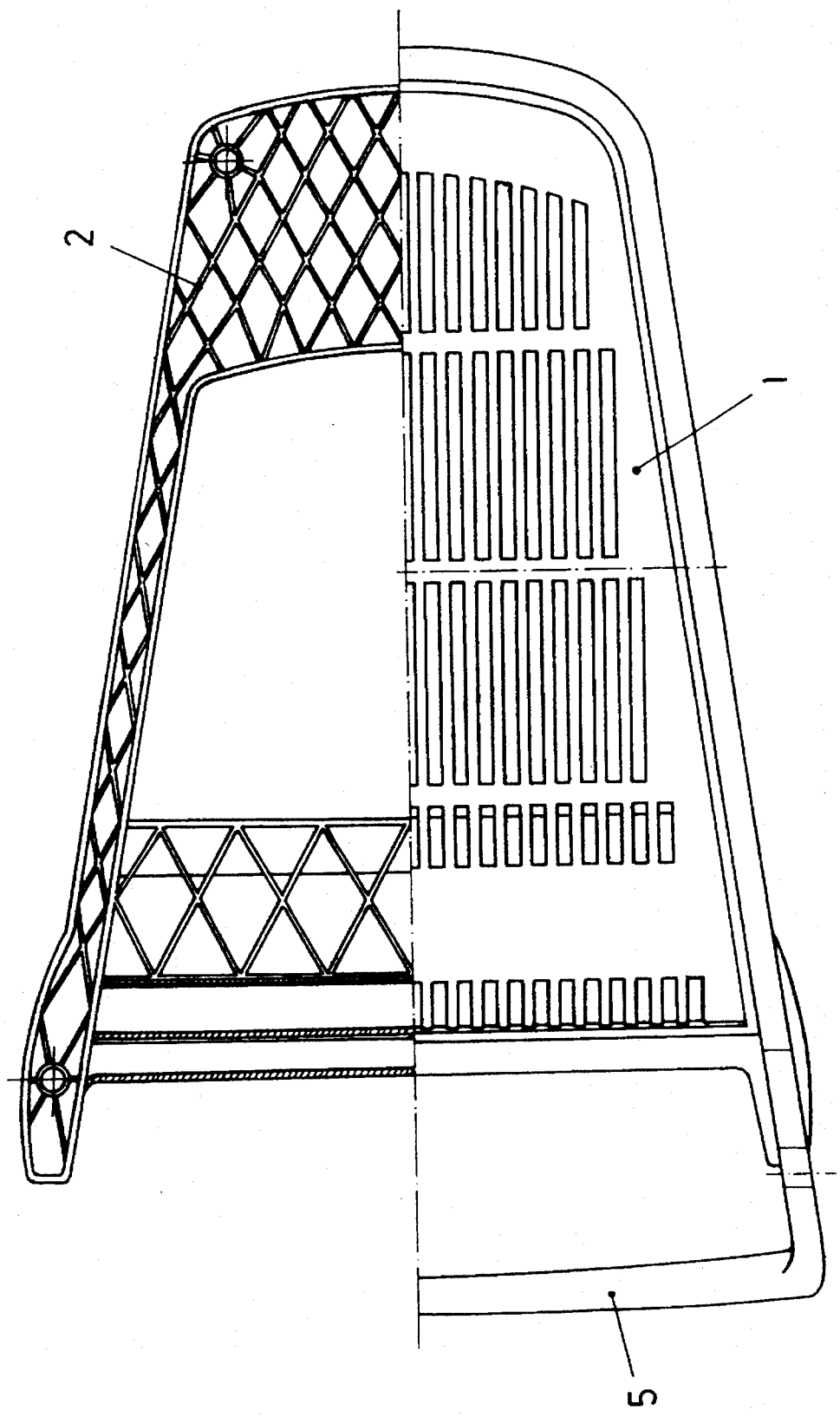
FIG. 5 is an enlarged plan view, with one half in cross section showing the lower structural base.

1. Basket
2. Base or carriage
3. Wheels
4. Support structure
5. Handle
6. Areas for advertising
7. Surrounding ribs
8. Articulated fixing formations
9. Lower abutment
10. Seat plate
11. Back plate
12. Angular piece
13. Fixing lugs
14. Insertion openings
15. Nesting recess
16. Bending zone
17. Additional platform
18. Swinging flap
19. Insertion housing
20. Advertising sheet
21. Transparent plate
22. Mouth
23. Insertion formations
24. Mounting formations
25. Insertion formations
26. Mounting formations
27. Slot
28. Perpendicular edge
29. Protruding formations
30. Receiver
31. Recess.

DETAILED DESCRIPTION OF THE INVENTION

In the drawings there is shown a shopping trolley for supermarkets and the like, which is made up from a single molding in plastics material, which includes unitarily the basket (1) for keeping the products, the base or carriage (2) in which are to be incorporated the wheels (3) for movement, and the support structure (4) in whose upper part is defined between both sides the corresponding user handle or grip (5) for maneuvering.

This whole assembly is made up with internal and/or external ribs, which give the necessary structural rigidity, while the walls and the base of the basket (1) may be provided with grooves, flat central zones or areas (6) being provided in the side and front faces of the said basket (1), surrounded by a raised rib (7) like a frame, in such a way that on the said zones (6) it is possible to incorporate advertising plates, by means of a simple insertion.

Figure 17:
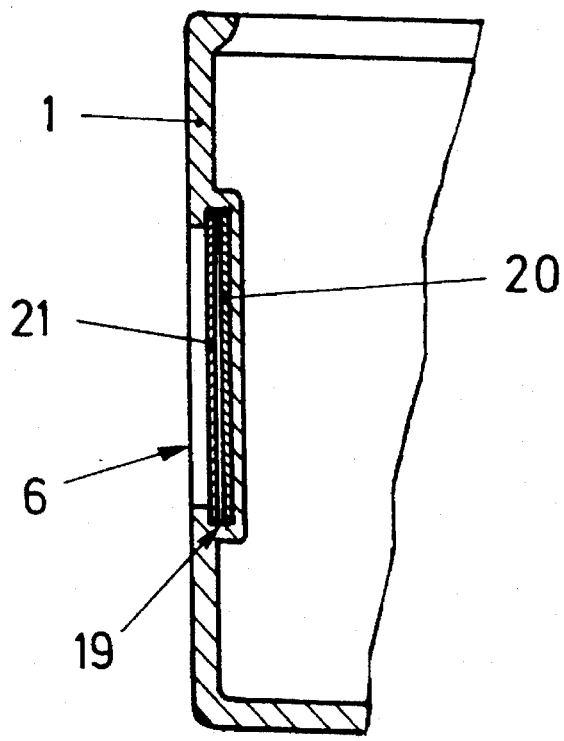
FIGS. 17 and 18 are both details which correspond respectively to a vertical section and a horizontal section of one of the areas of the basket intended for the incorporation of advertising on the trolley.
Figure 18:
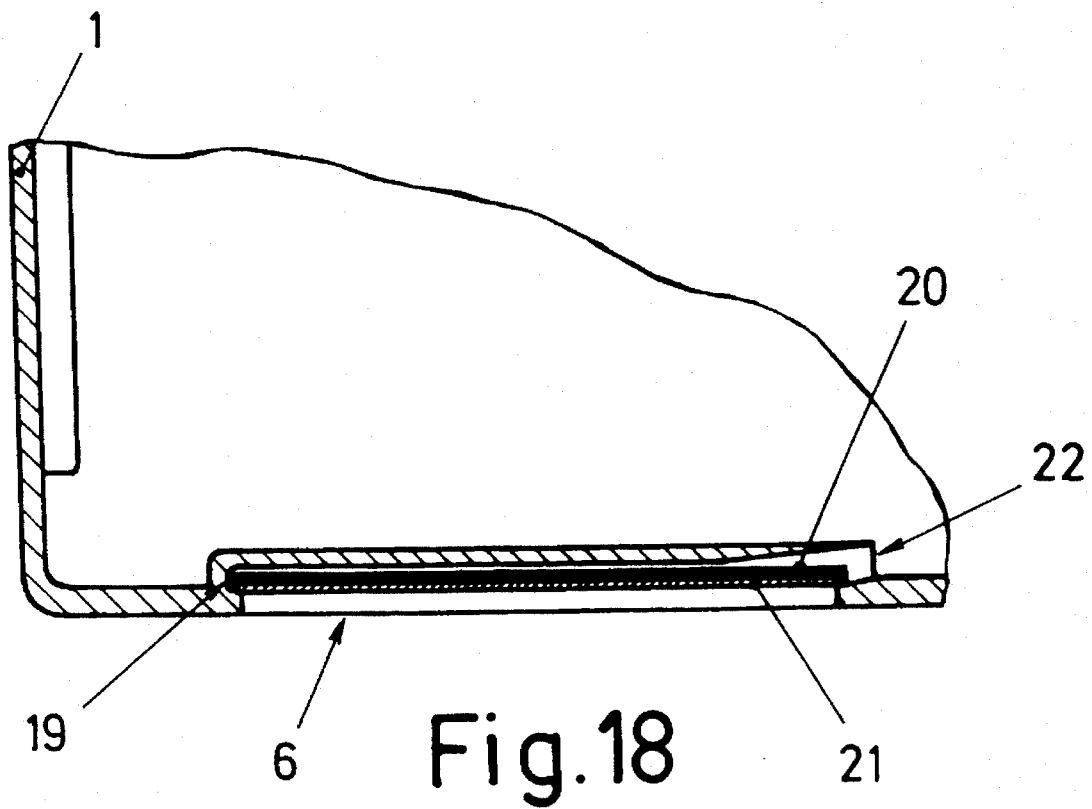

In accordance with one particular embodiment, which is non-limitative, as can be seen in FIGS. 17 and 18, the aforementioned advertising zones (6) may define a peripheral housing (19), either to situate the actual zone (6) in recess with respect to the corresponding wall of the basket (1), or projecting outwards from the contour, as with the rib (7) previously mentioned, in whose housing (19) is possible to mount the desired advertising sheets (20), which may be assembled on their own or jointly with a transparent plate (21) placed in front; it being foreseen that the housing (19) is open along one side or along the upper edge, to define a mouth (22) which facilitates the insertion and extraction of the sheets (20) and the plate (21) by simple sliding.

In the aforementioned unitary structural assembly, the rear part of the basket (1) remains open, the closure of this part being foreseen by means of an independent flap (18), also made of plastics, which is incorporated during assembly by means of an upper articulated fixing, by means of corresponding fixing formations (8), making in the lower part an abutment (9) which limits its rearwards movement.

Said flap (18) remains thus in a position in which it can swing inwards, by means of a gyration on the fixing formations (8), which permit the introduction of one trolley into another for stationary stacking, as in the case of conventional trolleys, to which end the basket (1), as well as the structural base (2) taper towards the front end, with the object of making it able to introduce the front of another trolley through the rear.

Figure 16:
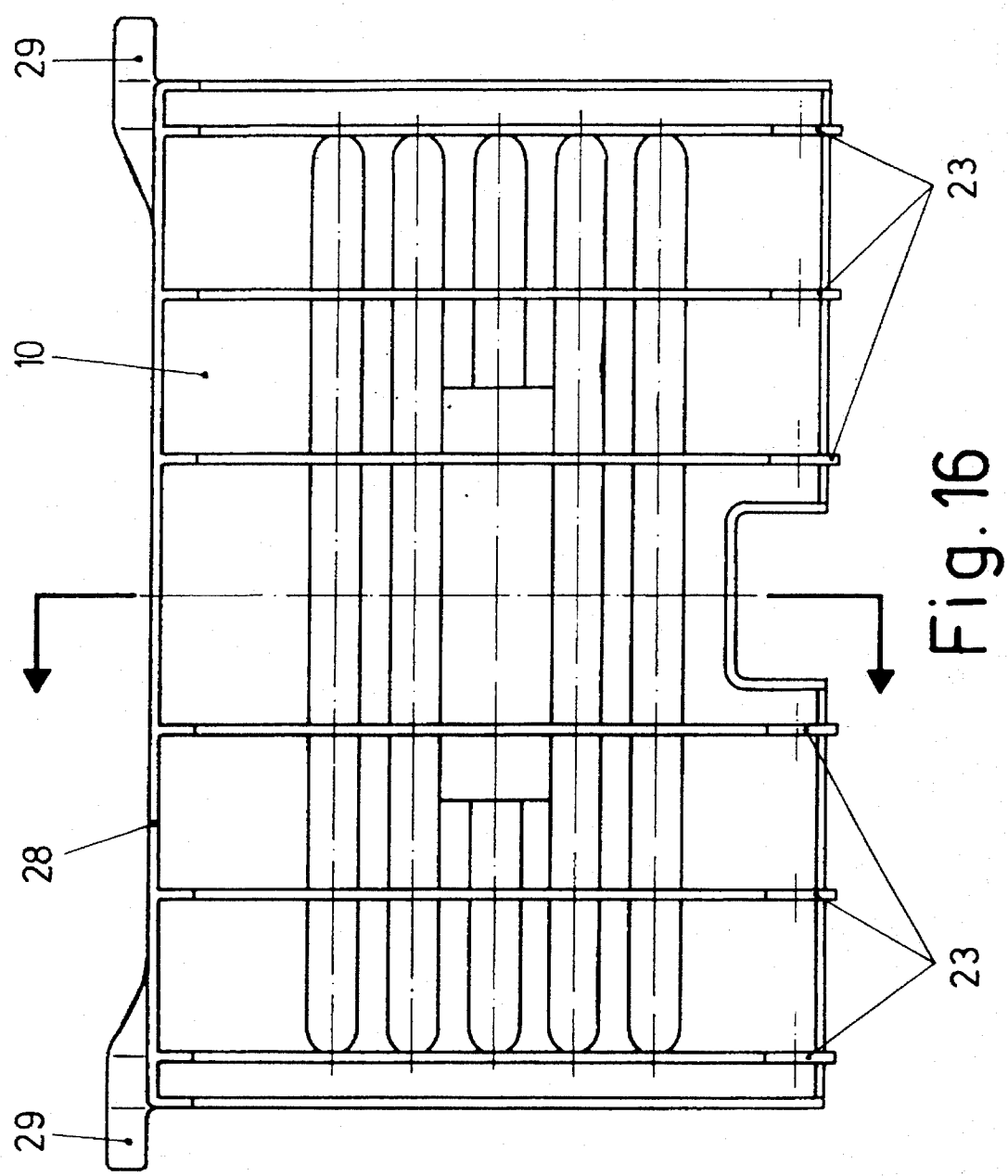
FIGS. 15 and 16 show respectively a side view in cross section and a corresponding front view of the plate which joined with the other aforementioned forms the folding seat assembly.
Figure 15:
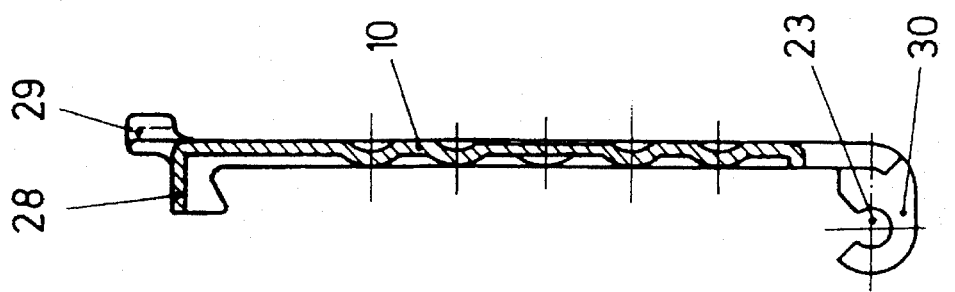

In the aforementioned flap (18), which is therefore like a collapsible door in this rear part of the basket (1), there is also foreseen the incorporation of a child seat, which is made up of two respective plates (10) and (11), mounted by articulated fixing on the flap (18) in such a way that one of the said plates (10), working as a seat, passes through the other plate (11), working as a back, making up a folding assembly which may remain collapsed in juxtaposition on the aforementioned flap (18), in such a way that it takes up little space in the inside of the basket (1); while to position it for use as a seat, it is necessary only to push and tilt the upper part to the plate (11) forming the back towards the inside of the basket, In accordance with one particular embodiment the plate (10) making up the seat, is provided (see FIGS. 15 and 16) with an undulating configuration, having on one end partially open cylindrical housings (23), through which is possible an insertion coupling on respective formations (24) of the flap (18), with a pivoting mounting which permits the swinging of the said plate (10).

The plate (11) forming the back, (see FIGS. 11, 12 and 13) having for its part other end housings (25), also partially open, by means of which is possible in its turn the insertion coupling on respective formations (26) of the flap (18), defining also a pivoting mounting which permits the swinging likewise of the said plate (11).

The aforementioned plate (11) has moreover a central slot (27), through which is passed during assembly the plate (10), which for its part has on the end opposite to that of the coupling on the flap (18), a perpendicular receiver (28) on the front edge and prominent formations (29) on the sides, constituting with all this an abutment which prevents the exit of the said end through the aforementioned slot (27) of the plate (11).

Figure 6:
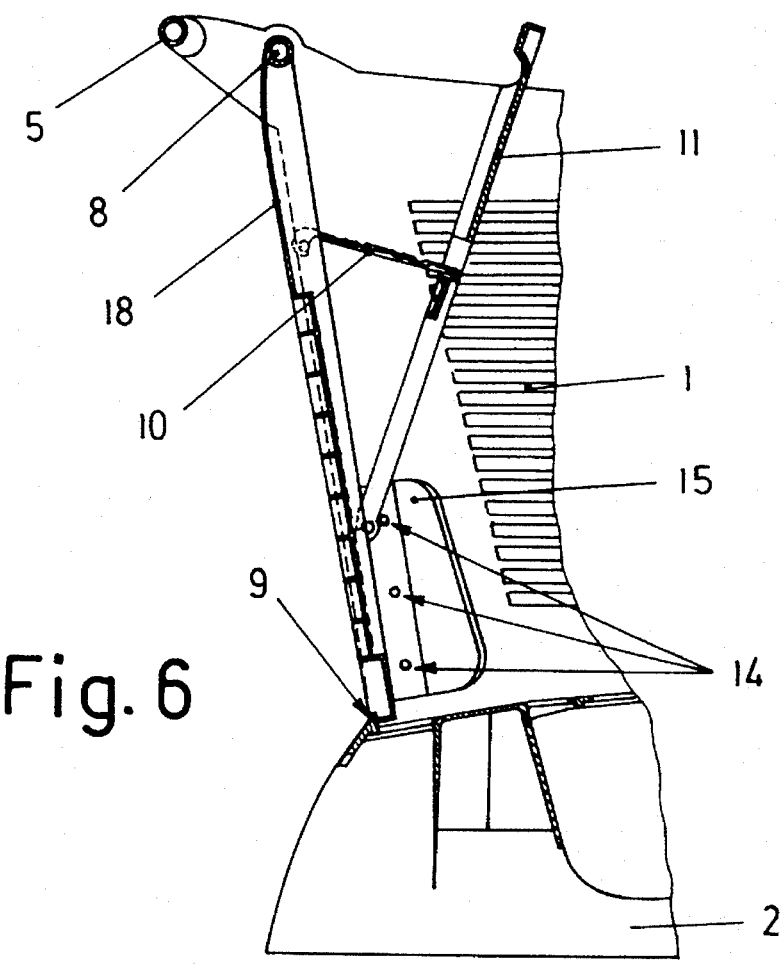
FIG. 6 is a detail in cross section which shows the position of the rear door of the basket, showing the child seat, which is incorporated therein, opened up.

In this way, a mounted assembly is defined between both plates (10) and (11) and the flap (18) such that when the plate (11) is swung from above towards the inside of the basket (1), the plate (10) draws back through the slot (27), until the formations (29) and the receiver (28) establish an abutment which assures the stability of the assembly in an unfolded position, as can be seen in Figure 6, that is to say with the plate (10) in a position as a seat base and the plate (11) in position as a back.

From this unfolded position, it is sufficient with a swing towards the rear of the plate (11), by means of simple pulling on the upper part of the same towards the flap (18), for the said plate (11) to be collapsed in juxtaposition against the aforementioned flap (18), at the same time as the plate (10) draws back through the slot, in order to collapse down by the other side on the actual door (18) between the sides of that plate (11), the whole assembly thereby being folded, without projecting inside the basket (1), and without obstructing the placing of objects inside the same.

With a view to the ability to fold, the plate (10) is provided with a receiver (30) in the end where the mounting couplings (23) go, which permits the said plate (10) to fall down without difficulty in front of the plate (11) when this arrives in juxtaposition against the flap (18); while the said plate (11) is provided with recesses (31) which permit the adaptation on the articulations (8) of the mounting of the door (18), making possible the return of the aforementioned plate (11) with respect to this flap (18), in order that the structure of the seat remains almost completely concealed in the folded position.

Figure 7:
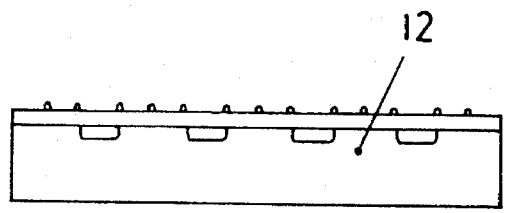
FIGS. 7, 8 and 9 are all corresponding views in elevation, profile and from above, of one of the tongues which may be incorporated in the trolley on the sides of the rear flap of the basket.
Figure 8:
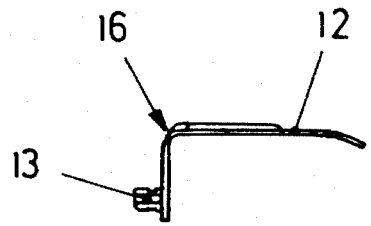
Figure 9:
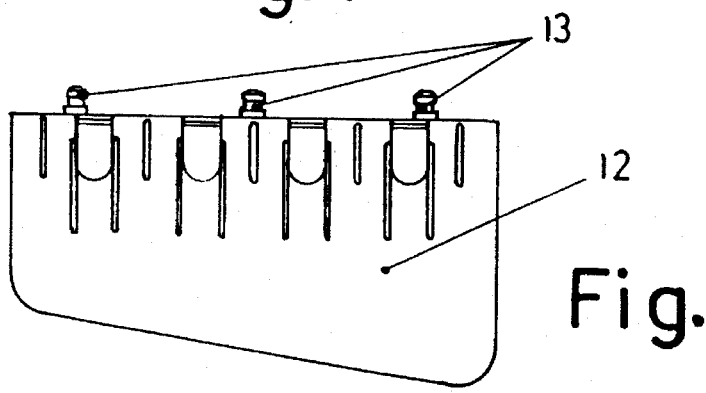

With the intention of preventing the possible escape of small articles between the door (18) and the corresponding side walls of the structural assembly of the basket (1), in the lower zone of the corresponding part of the supporting structure (4), which is where such an eventuality could occur, there is foreseen the incorporation on the side walls themselves of tongue-like pieces (12), such as that shown in FIGS. 7 to 9.

The said pieces (12) are, as can be seen, of a dihedral shape, being fixed by one of their wings, by means of the insertion of some lugs (13) in corresponding holes (14) made in the side walls of the basket (1), in such a way that the other wing remains perpendicularly towards the inside, in front of the flap (18), consequently closing the space which may exist between this and the respective sides of the basket (1).

This incorporation of the aforementioned pieces (12) is established in a nesting recess (15) of the said side walls of the basket (1), such pieces (12) having in the edge of the corner a bending zone (16); in such a way that on effecting the introduction of one trolley into another in the stack, said pieces (12) flex lodging themselves in the corresponding nesting recesses (15), allowing the introduction of the stacking between the trolleys referred to, without any difficulty.

In accordance with one particularity, in order to increase the possibilities of loading on the trolley, it is foreseen that a platform 17 on the base structure or carriage (2) may be incorporated to permit the placing of objects also on this base (2); the aforementioned platform (17) must be a swinging assembly, as can be seen in FIG. 1, to permit the stacking introduction of the trolleys.

The grip or handle (5) is provided with a section adequate safely to support the stresses to which it must be submitted when maneuvering the trolley, it being foreseen that said grip (5) has at least in one zone an appropriate section for the fixing of the coin holder with which it is necessary to provide these trolleys for their attachment to each other and to the corresponding place in the stacked parking of the same.

Without altering the concept and the essence of the invention, for the advertising on the trolley, in the same way there could be provided supports also incorporated on the zones (6), fixed by adhesive, screwing or any other conventional method.

I claim:

1. A shopping trolley comprising:

a basket defining a nesting recess mounted on a support structure having a user handle and which support structure is mounted on a wheeled carriage, the basket having a rear opening to permit nesting of similar trolleys via corresponding nesting recesses, the rear opening being closed by a swinging flap, pivotally mounted to the basket said rear opening having sides, a space is defined between the swinging flap and the sides of the rear opening, said rear opening in the basket is in part closed by angular pieces coupled to said basket and disposed in the lower part of a space which remains between said swinging flap and said sides of the rear opening, and protruding behind the swinging flap, said angular pieces having a bending zone, whereby said pieces are retractable into said corresponding nesting recessess when the trolleys are nested togethers the shopping trolley comprising a single plastics molding including said basket, said support structure, and said wheeled carriage.

2. A shopping trolley according to claim 1, wherein at least one generally flat area is on at least one of the front walls and the side walls of the basket, said area both being surrounded by retaining ribs, said retaining ribs defining the edges of a recessed, smooth surface adapted for the adhesion of an advertising plate.

3. A shopping trolley according to claim 2, wherein said at least one area has a peripheral housing, in which an advertising plate can be inserted, said housing being open at one side edge, for the introduction and extraction of the plates.

4. A shopping trolley according to claim 1, wherein a pair of plates (10,11) hingedly mounted on the swinging flap (18) of the basket (1) such that the plate (10) passes midway through the plate (11), said plates (10,11) constituting an assembly which is foldable against the swinging flap (18), and which can be erected to form a child's seat with a back.

* * * * *